United States Patent
Yoon et al.

(10) Patent No.: US 8,396,005 B2
(45) Date of Patent: Mar. 12, 2013

(54) HIGH-SPEED IP FLOW MEDIATION APPARATUS USING NETWORK PROCESSOR

(75) Inventors: Sang Sik Yoon, Gwangju (KR); Tae Sang Choi, Daejeon (KR); Sang Wan Kim, Daejeon (KR); Dong Won Kang, Daejeon (KR); Joon Kyung Lee, Daejeon (KR); Kyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 12/629,373

(22) Filed: Dec. 2, 2009

(65) Prior Publication Data

US 2010/0135182 A1 Jun. 3, 2010

(30) Foreign Application Priority Data

Dec. 2, 2008 (KR) .......................... 10-2008-0121238
Apr. 9, 2009 (KR) .......................... 10-2009-0030886

(51) Int. Cl.
*G01R 31/08* (2006.01)
(52) U.S. Cl. ........ 370/252; 370/230; 370/235; 370/463; 370/419; 370/359
(58) Field of Classification Search .................. None
See application file for complete search history.

(56) References Cited

U.S. PATENT DOCUMENTS

| 6,195,359 | B1 * | 2/2001 | Eng et al. ...................... 370/401 |
| 7,103,682 | B2 * | 9/2006 | Meyer et al. ...................... 710/8 |
| 2003/0154317 | A1 * | 8/2003 | Ishibashi et al. .............. 709/253 |
| 2003/0172147 | A1 * | 9/2003 | Chang et al. .................. 709/223 |
| 2003/0200324 | A1 * | 10/2003 | Jeong ............................ 709/230 |
| 2005/0013300 | A1 * | 1/2005 | Akahane et al. ........... 370/395.3 |
| 2005/0249125 | A1 * | 11/2005 | Yoon et al. .................... 370/252 |
| 2007/0025396 | A1 * | 2/2007 | Ajima .......................... 370/474 |

FOREIGN PATENT DOCUMENTS

| JP | 2008-54190 | 3/2008 |
| KR | 102008008719 | 10/2008 |

* cited by examiner

*Primary Examiner* — Kibrom T Hailu
(74) *Attorney, Agent, or Firm* — Nelson Mullins Riley & Scarborough LLP; EuiHoon Lee, Esq.

(57) ABSTRACT

There is provided a high-speed IP flow mediation apparatus using a network processor. The apparatus includes a server collecting flow information regarding IP traffic on a high-speed line and a network processor board analyzing the collected information according to Internet applications using a network processor, and transferring the analyzed flow information to a plurality of flow analysis systems.

5 Claims, 1 Drawing Sheet

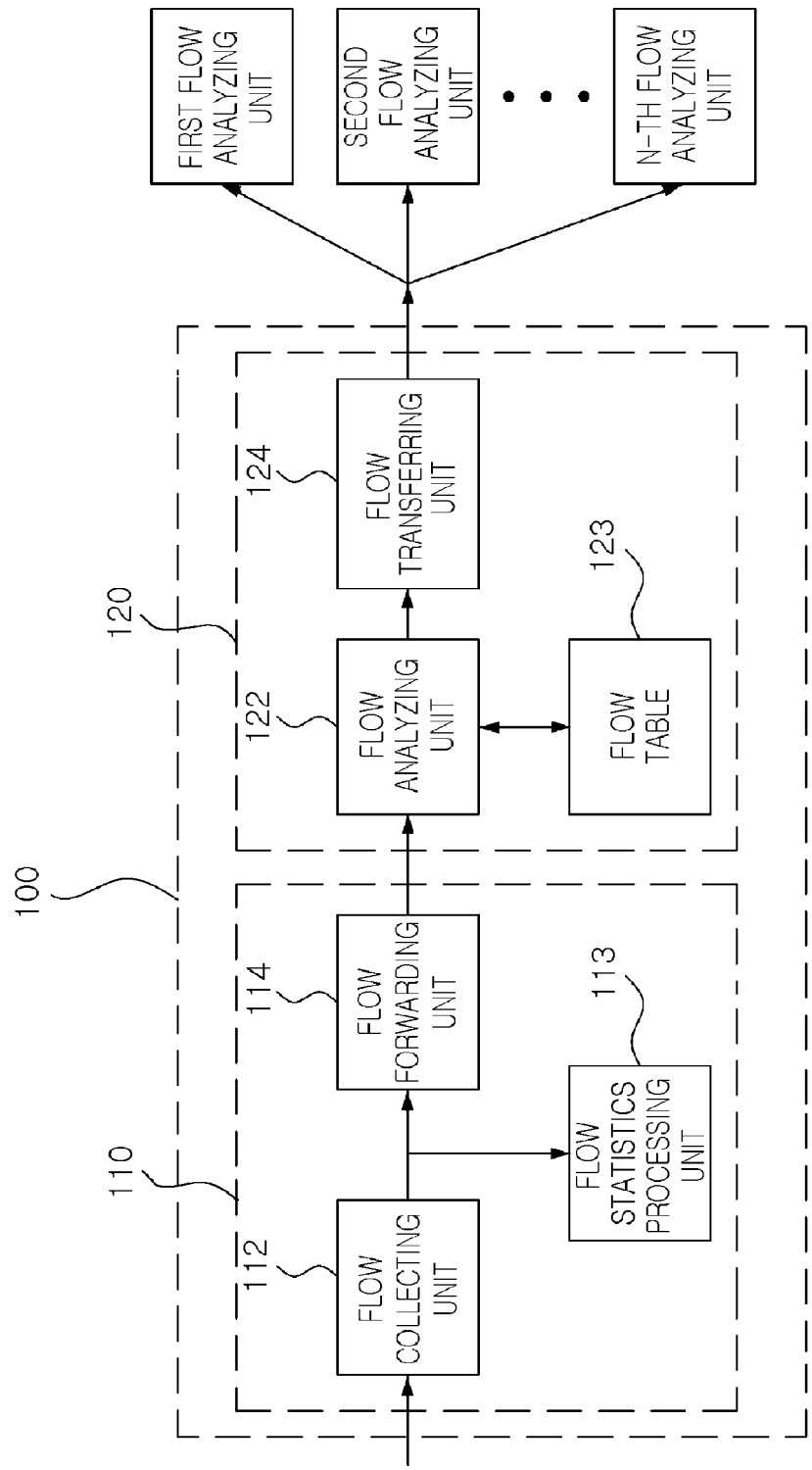

HIGH-SPEED IP FLOW MEDIATION APPARATUS USING NETWORK PROCESSOR

CROSS-REFERENCE TO RELATED APPLICATIONS

This application claims the priorities of Korean Patent Application Nos. 10-2008-0121238 filed on Dec. 2, 2008 and 10-2009-0030886 filed on Apr. 9, 2009, in the Korean Intellectual Property Office, the disclosures of which are incorporated herein by reference.

BACKGROUND OF THE INVENTION

1. Field of the Invention

The present invention relates to an IP flow mediation apparatus, and more particularly, to an IP flow mediation apparatus using a common Network Processor (NP), employing a technique for transferring received IP flow information to specified analysis servers without loss by high-speed processing in the technical field of traffic measurement and analysis on high-speed lines with data flow rates higher than multiple gigabits per second (Gbps).

2. Description of the Related Art

In accordance with a conventional IP flow mediation method, a server receives flow information from a dedicated flow information generator or a router, and the received flow information is analyzed and processed.

In such an IP flow mediation method, a lossless data process is enabled on a low-speed line (with data flow rates lower than 1 Gbps) according to an improvement in Central Processing Unit (CPU) speed. However, since the amount of input flow information on a high-speed line (with data flow rates higher than multiple-Gbps) is very large, it is difficult to process the large amount of high-speed data transferred to the server without loss.

SUMMARY OF THE INVENTION

An aspect of the present invention provides an IP flow mediation apparatus using a general server and a Network Processor (NP) in order to transfer lossless data to certain application servers which perform a detailed analysis of flow information regarding IP traffic on a high-speed line according to applications.

According to an aspect of the present invention, there is provided a high-speed IP flow mediation apparatus using a Network Processor (NP), the high-speed IP flow mediation apparatus including: a server collecting flow information regarding IP traffic on a high-speed line; and a network processor board analyzing the collected information according to Internet applications using a network processor, and transferring the analyzed flow information to a plurality of flow analysis systems.

BRIEF DESCRIPTION OF THE DRAWINGS

The above and other aspects, features and other advantages of the present invention will be more clearly understood from the following detailed description taken in conjunction with the accompanying drawing, in which:

FIG. 1 schematically illustrates a configuration for a high-speed IP flow mediation apparatus using a Network Processor according to an exemplary embodiment of the present invention.

DETAILED DESCRIPTION OF THE PREFERRED EMBODIMENT

Exemplary embodiments of the present invention will now be described in detail with reference to the accompanying drawing. However, detailed descriptions related to well-known functions or configurations will be ruled out in order not to unnecessarily obscure subject matters of the present invention.

In an exemplary embodiment of the present invention, flow information regarding IP traffic on a high-speed line is collected using a Central Processing Unit (CPU) server, and flow information is processed in a lossless manner at a high speed using a Network Processor board having a Network Processor capable of high-speed processing (hereinafter referred to as "NP") and taking the form of a Network Interface Card (NIC) based Peripheral Component Interconnect (PCI).

The NP is a programmable device designed to be capable of performing operations such as packet processing, protocol analysis, voice/data integration, and Quality of Service (QoS), which are present in a communications system while maintaining high-speed processing and improved performance acquired by a conventional Application Specific Integrated Circuit (ASIC). The NP is able to provide enhanced packet processing and various network services, and has the characteristics of expansion and flexibility as well as high-speed processing capability.

Since the NP board is fitted into a PCI slot like an NIC card, there are the attendant advantages of reducing space requirements and total system cost as well as maximizing flow processing. Common NP boards available at present are the Intel IXP2$_{XXX}$, the Octeon Multi-core, the Ezchip, or the like. An Octeon NicPro card is to be used in the system according to an exemplary embodiment of the present invention.

FIG. 1 schematically illustrates a configuration for a high-speed IP flow mediation apparatus using an NP according to an exemplary embodiment of the present invention.

Referring to FIG. 1, a high-speed IP flow mediation apparatus 100 includes a server 110 collecting flow information regarding IP traffic on a high-speed line with data flow rates higher than multiple gigabits per second, and an NP board 120, which is fitted into the server 110, analyzing and processing the collected flow information and transferring the flow information to a plurality of flow analysis systems.

The server 110 includes a flow collecting unit 112, a flow statistics processing unit 113, and a flow forwarding unit 114.

The flow collecting unit 112 receives flow information regarding high-speed Internet traffic (e.g. CISCO Netflow information) from a flow information generator or a router and forwards the received flow information to the flow forwarding unit 114.

Also, in case of the need therefor, the flow collecting unit 112 may calculate basic statistical information based on the flow information using the flow statistics processing unit 113 and store selectively input flow information on a hard disk drive (HDD).

The flow forwarding unit 114 transfers the flow information to the NP board 120 fitted into the server 110. Here, the flow forwarding unit 114 may transfer the flow information in a manner of using a PCI interface, Direct Memory Access (DMA), or the like. This allows the server 110 to transfer flow information coming from the outside to the NP board 120 in a lossless manner at a higher speed with minimum delay.

Accordingly, functions requiring high-speed data processing are implemented in hardware by using a microcoding scheme to thereby improve the processing speed, and thus lossless real time high-speed data processing is realized.

The NP board 120 includes a flow analyzing unit 122, a flow table 123, and a flow transferring unit 124.

The flow analyzing unit 122 combines a two-way flow using the flow table 123 in which the flow information is temporarily stored, or searches the contents of the flow information using a Deep Packet Inspection (DPI) function, and then performs a detailed analysis of the flow information according to Internet applications such as a P2P and streaming. After that, the flow analyzing unit 122 transfers the analyzed flow information to the flow transferring unit 124.

The flow transferring unit 124 transfers the transferred flow information to the plurality of flow analysis systems in a lossless manner according to a preset rule.

As is apparent from the above description, the present invention provides the advantages of performing mediation by processing IP flow information generated and transferred from an Internet high-speed line with data flow rates higher than multiple gagabits per second in a lossless manner and being able to be widely used in a variety of Internet traffic measurement and analysis systems.

Also, the NP system in the form of NIC performing high-speed processing is used in a manner that would be fitted into the PCI slot of the server, thereby considerably reducing the physical space requirements of the entire flow mediation system and allowing for the minimization of cost and the maximization of performance, in comparison with a relatively expensive independent NP system.

While the present invention has been shown and described in connection with the exemplary embodiments, it will be apparent to those skilled in the art that modifications and variations can be made without departing from the spirit and scope of the invention as defined by the appended claims.

What is claimed is:

1. A high-speed IP flow mediation apparatus using a network processor, comprising:
 a server collecting flow information regarding IP traffic on a high-speed line; and
 a network processor board analyzing the collected flow information according to Internet applications using a network processor, and transferring the analyzed flow information to a plurality of flow analysis systems,
 wherein the server forwards the collected flow information to the network processor board in a manner of using a Peripheral Component Interconnect (PCI) interface,
 wherein the network processor board is fitted into a PCI slot of the server,
 wherein the network processor board comprises:
 a flow analyzing unit analyzing the collected flow information according to the Internet applications; and
 a flow transferring unit transferring the analyzed flow information to a plurality of flow analysis systems,
 wherein the flow transferring unit transfers the flow information to the plurality of flow analysis systems in a lossless manner according to a preset rule.

2. The high-speed IP flow mediation apparatus of claim 1, wherein the server comprises:
 a flow collecting unit collecting the flow information; and
 a flow forwarding unit forwarding the collected flow information to the network processor board.

3. The high-speed IP flow mediation apparatus of claim 2, wherein the server further comprises:
 a flow statistics processing unit calculating basic statistical information based on the collected flow information.

4. The high-speed IP flow mediation apparatus of claim 1, wherein the flow analyzing unit combines a two-way flow using a flow table temporally storing the collected flow information or searches contents of the flow information using a Deep Packet Inspection (DPI) function, and then analyzes the flow information according to the Internet applications.

5. The high-speed IP flow mediation apparatus of claim 1, wherein the network processor board takes a form of a Network Interface Card (NIC) based Peripheral Component Interconnect (PCI).

* * * * *